Sept. 4, 1945. E. P. WORTHEN ET AL 2,384,226
OIL FIRED SINGLE EFFECT EVAPORATOR
Filed Aug. 29, 1944 5 Sheets-Sheet 1

Inventors
Eugene P. Worthen
and Benjamin Fox.
By R. S. A. Dougherty
Attorney

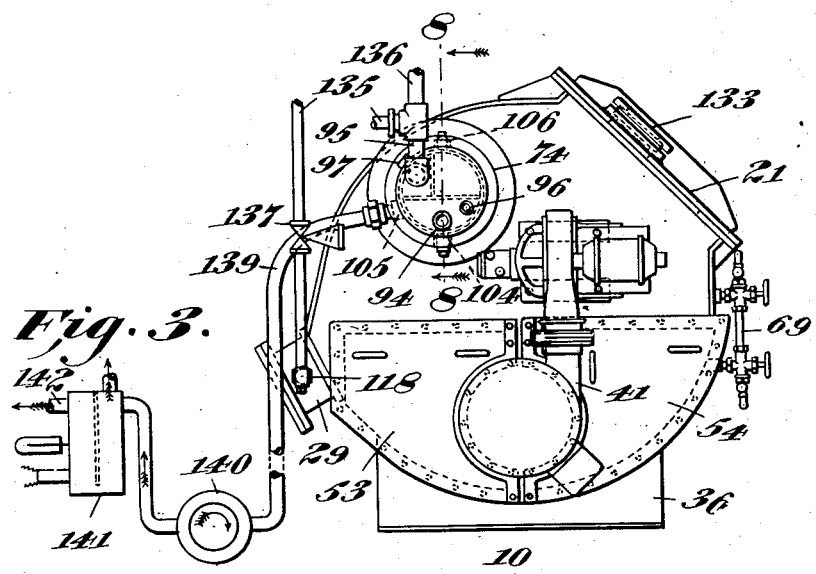
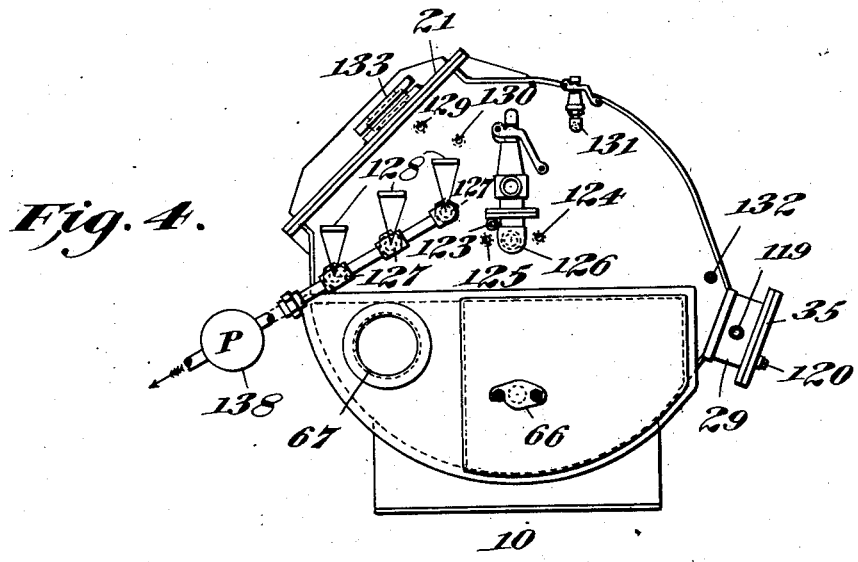

Sept. 4, 1945.  E. P. WORTHEN ET AL  2,384,226
OIL FIRED SINGLE EFFECT EVAPORATOR
Filed Aug. 29, 1944   5 Sheets-Sheet 3

Inventors
Eugene P. Worthen
and Benjamin Fox.
By R. S. A. Dougherty,
Attorney

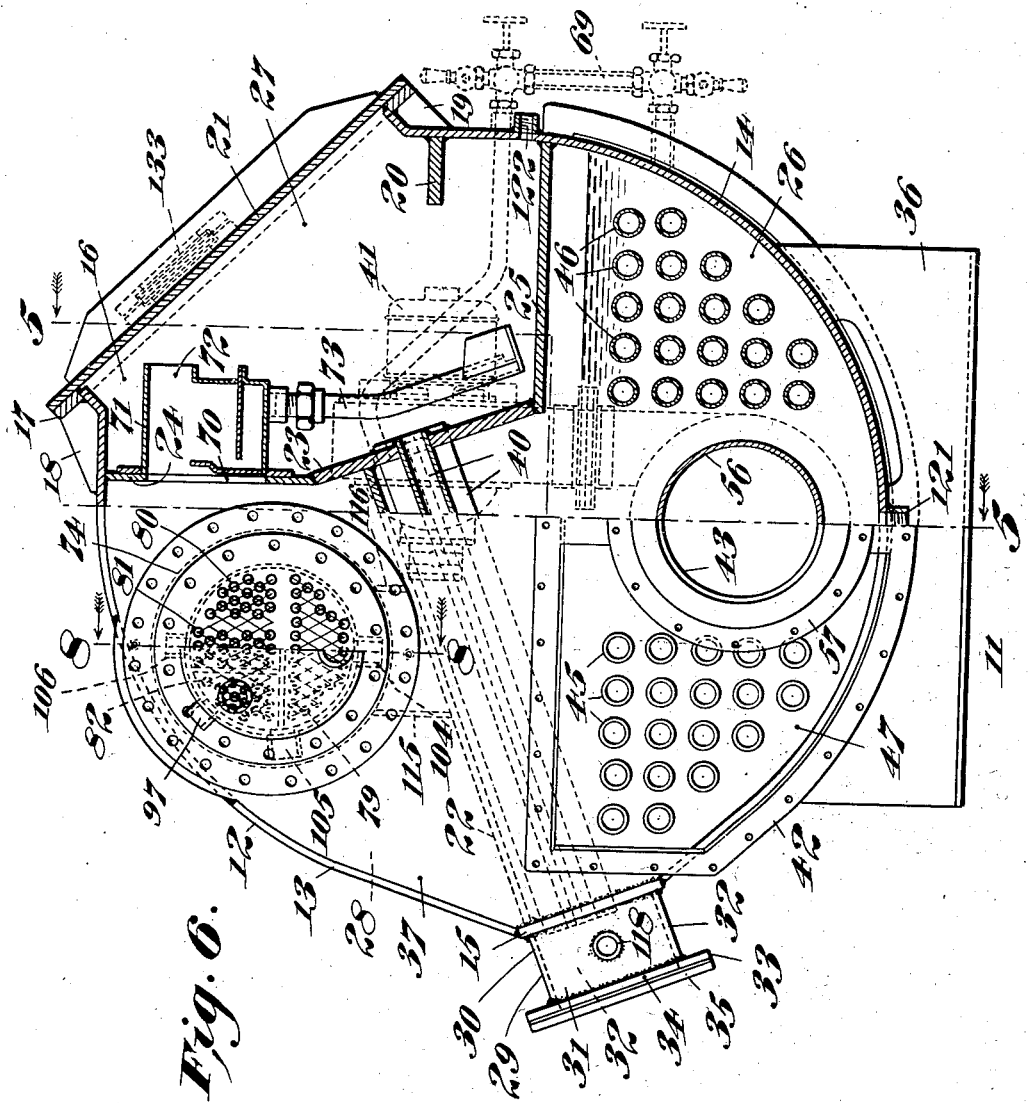

Sept. 4, 1945.  E. P. WORTHEN ET AL  2,384,226
OIL FIRED SINGLE EFFECT EVAPORATOR
Filed Aug. 29, 1944   5 Sheets-Sheet 5
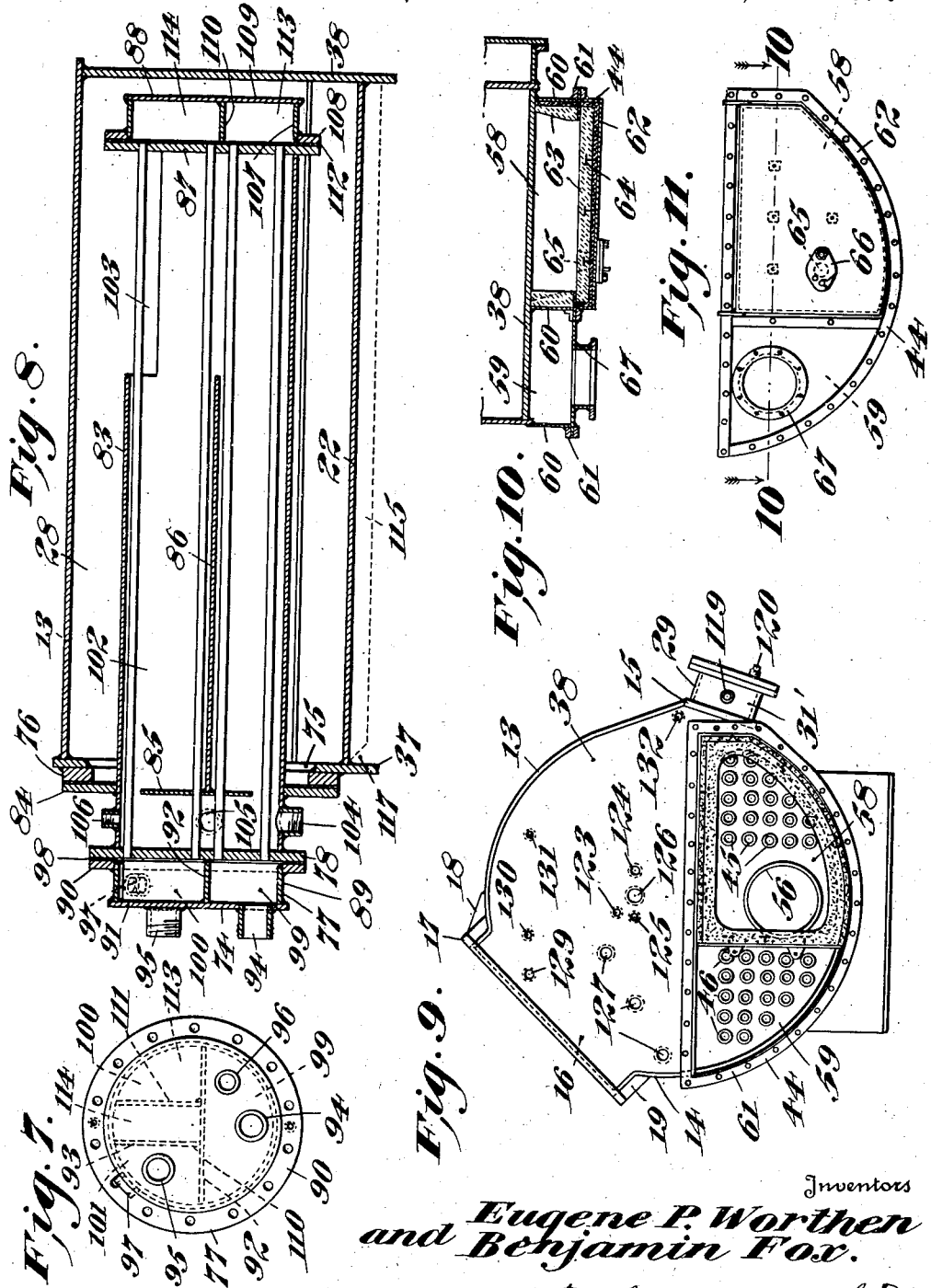
Inventors
Eugene P. Worthen
and Benjamin Fox.
By R. S. A. Dougherty
Attorney Patented Sept. 4, 1945

2,384,226

UNITED STATES PATENT OFFICE 2,384,226

OIL FIRED SINGLE EFFECT EVAPORATOR

Eugene Porter Worthen, Braintree, and Benjamin Fox, Wollaston, Mass., assignors, by mesne assignments, to Buena Vista Iron Company, a corporation of New Jersey Application August 29, 1944, Serial No. 551,752

9 Claims. (Cl. 202—194)

This invention relates to an improved self-contained apparatus for evaporating and distilling. It relates more especially to small oil or gas fired distilling plants for use on board ships, and in isolated localities where it is necessary to supply fresh or pure water demands from salt water, or from contaminated fresh water.

The exigencies of modern war have created a need for low pressure, oil or gas fired, distilling plants for use in Diesel engine propelled ships such as tank landing barges and ocean going tugs where steam is not available for evaporator purposes. Such a unit is available for submarine installations in place of more complicated electrical evaporators now in use. In the military field there is also a demand for small oil fired distilling plants for furnishing fresh water on island bases where a supply of natural fresh water is not available. In times of peace, industrial and chemical plants will find such an apparatus valuable for use in localities where they require a supply of distilled water but have no readily available source of steam.

Therefore it is an especial object of our invention to provide a low pressure, single effect, oil fired, distilling plant that is ideally suited for the purposes just recited by reason of the combining into a single compact unit the various essential units required for the evaporating and distilling of salt or contaminated fresh water, and that the said essential units shall comprise an oil fired boiler and an evaporator in such a manner that no piping is required between the two, and the water in the boiler remains in a closed system requiring no make-up and no feed pump, and wherein the generation and condensation of steam in the said closed circuit acts as the means of transferring the heat from the hot products of combustion to the contaminated or salt water in the evaporator. With this arrangement the hot gases of combustion are prevented from contacting the evaporator tubes and thus prevents the rapid formation of salt scale that would soon make the plant inoperative. A further feature of our invention is the use of inclined evaporator tubes where the evaporation of water within the tubes results from the condensation of steam outside the tubes, and therefore scale formations occur on the inside of the tubes. These formations are readily removed by removing the inspection cover and the feed box cover and turbining the tubes with standard turbine driven rotary tube cleansing brushes.

Another object of our invention is to arrange the various necessary units required for said distilling plant within and upon a single shell container with due regard to their sequential and cooperating relationships to the end that economy and efficiency of operation and a weight and space saving compactness of design results thereby.

Other objects and advantages will be apparent from the following description wherein reference is made to the accompanying drawings illustrating the preferred embodiment of our invention and wherein similar reference numerals designate similar parts throughout the several views.

Fig. 3 is a front elevation thereof.

Fig. 4 is a rear elevation thereof.

Fig. 6 is a view as viewed at the front end being in part section at the center of Fig. 5 but with oil burner and blower shown in imaginary lines, and in part full elevation with cover plates removed.

Fig. 7 is a view showing the exterior front end elevation of the combined distilling condenser and condensate cooler showing in dotted lines the division walls within the front and rear heads.

Fig. 8 is a vertical sectional elevation taken along the line 8—8 of Fig. 6 showing the combined distilling condenser and condensate cooler as positioned in the container shell.

Fig. 9 is a rear elevation of the container shell with the rear boiler head removed.

Fig. 10 is a sectional view of the rear end of the furnace portion of the container shell taken along the line 10—10 of Fig. 11.

Fig. 11 is a rear elevation of the rear boiler head.

Figure 1:
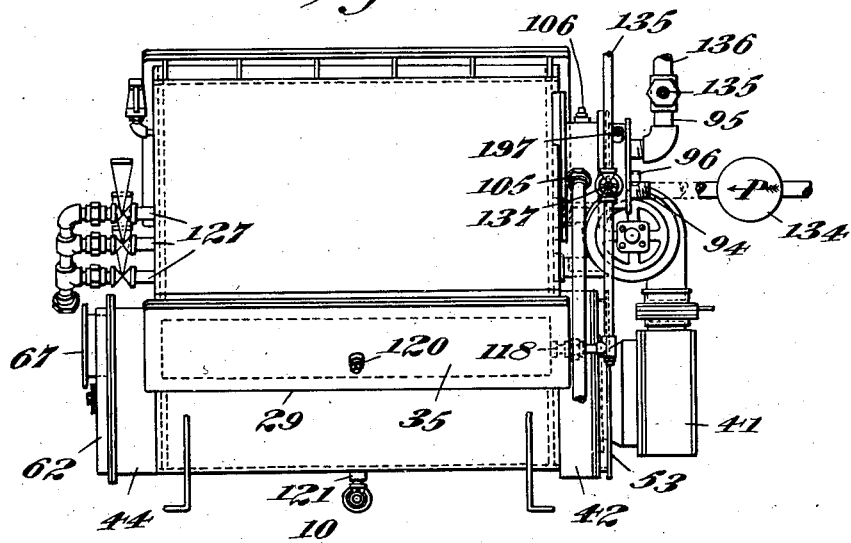
Fig. 1 is a side elevation of our improved apparatus.

Referring now to the drawings the numeral 10 designates our improved evaporating and distilling apparatus as a unit. The numeral 11 designates the container shell which preferably is made up of welded steel plate as indicated but may of course be otherwise conventionally constructed. The container shell 11 constitutes the tank or container for the boiler water, and for the water to be evaporated and distilled, and also acts as the mounting for the various units required to accomplish the said evaporation and distillation.

It may be particularly noted in Figs. 5 to 11, inclusive, that the container shell 11 comprises a substantially cylindrical exterior body casing 12 comprised of the top wrapper plate 13, the bottom wrapper plate 14, and exterior evaporator tube sheet plate 15. A large full length opening 16 disposed at an angle on the top right hand side of the body casing 12 is reenforced by the surrounding flange 17 body braced by the brace members 18 and 19 and further braced by the interior stiffener 20. The opening 16 is normally closed by the inspection door 21. The flange 17 and the peripheral edges of the door 21 are adapted for retaining devices such as bolts (not shown) whereby the door 21 is removably attached to said body casing 12. The interior of the body casing 12 is divided longitudinally into three compartments by the division wall plate 22, the interior evaporator tube sheet plate 23, the upper vertical division wall plate 24, and the lower horizontal division wall plate 25.

The lower boiler compartment 26 extending full length and full width of the said body casing 12 is peripherally defined by the tube sheet plate 15, the bottom wrapper plate 14, the division wall plate 25, the major part of tube sheet plate 23, and the division wall plate 22. The evaporator compartment 27 extending full length in the upper right quadrant of the body casing 12 is defined by the right hand end of the upper wrapper plate 13, the door 21, the right hand end of the bottom wrapper plate 14, the division wall plate 25, the tube sheet plate 23, and the division wall plate 24. The distilling condenser and condensate cooler compartment 28 extending full length in the upper left hand quadrant of the body casing 12 is defined by the upper wrapper plate 13, the division wall plate 22, the upper edge of the tube sheet plate 23, and the division wall plate 24.

Extending outwardly from the tube sheet plate 15 and integrally attached thereto is the feed water box 29 comprised of the top plate 30, front end plate 31, bottom plate 32, rear end plate 31', and flange 33. The outer opening 34 of feed water box 29 is normally closed by the inspection cover 35. The flange 33 and the peripheral edges of the cover 35 are adapted for retaining devices such as bolts (not shown) whereby the cover 35 is removably attached to said feed water box 29.

Extending downwardly from near each end of the bottom wrapping plate 14 and integrally attached thereto as by welding are the foundation plates 36.

The container shell 11 comprises in addition to the body casing 12 the front casing head 37 and the rear casing head 38. These casing heads are integrally attached as by welding to the end edges of the said compartment defining members comprising the body casing 12 and thus make the compartments 26, 27, and 28 individually water-tight containers except as hereinafter set forth.

The boiler compartment 26 comprises therewithin a fire tube boiler 39 for generating steam from fresh water, and a bank of evaporating tubes 40 for evaporating salt water on the inside of the tubes 40 by the condensation of the steam generated by the boiler on the outside of the tubes 40. The evaporating tubes 40 are supported water-tight at their lower outer ends in the exterior evaporator tube sheet plate 15 and slope upwardly through the triangularly shaped pocket formed beneath the division wall plate 22 in the upper part of the boiler compartment 26, and are supported water-tight at their upper ends in the interior evaporator tube sheet plate 23. The tubes 40 serve to communicate the interior of the feed water box 29 with the interior of the evaporator compartment 27.

The fire tube boiler 39 comprises the oil burner and blower unit 41, front fire box 42, fire tube furnace flue 43, back fire and smoke box 44, and the banks 45 and 46 of boiler tubes.

The oil burner and blower unit 41 is preferably a standard commercial pressure atomizing type of combined oil burner and motor driven blower for burning light Diesel oil. However, arrangements can be made for burning almost any type of fuel oil or gas. The oil burner unit 41 is detachably mounted as by bolts (not shown) upon the front casing head 37 and the outwardly extending front end of the fire tube furnace flue 43.

The front fire box 42 forms a fire-tight compartment 47 surrounding the outer front end of the flue 43 and communicates the front ends of the banks of fire tubes 45 and 46, the one with the other. The fire box 42 comprises the wrapper plate 48 welded to front casing head 37, flange 49, wrapper plate insulation 50, insulation mesh cover 51, gasket 52, detachable insulated covers 53 and 54, and cover retaining devices (such as bolts) 55.

The fire tube furnace flue 43 comprises the flue 56, and the front flange 57. The flue 56 extends through the fire compartment 47 is supported water-tight in the front casing head 37 and in the rear casing head 38 as by welding and serves to communicate the oil burner unit 41 with the back fire and smoke box 44. The flange 57 serves as a mounting for the oil burner unit 41 and the covers 53 and 54.

The back fire and smoke box 44 comprises a fire-tight compartment 58 communicating the back end of the furnace flue 56 with the back ends of the bank 45 of boiler tubes; and a smoke-tight compartment 59 communicating the back ends of the bank 46 of boiler tubes with the atmosphere. The compartments 58 and 59 are formed by a wrapper plate 60 welded to the rear casing head 38. Welded to the outer edges of the wrapper plate 60 are flanges 61 to serve as mounting means for the flanged cover plate 62. The flanged cover plate 62 is removably attached to the flanges 61 by suitable retaining means (such as bolts) not shown. The interior of the compartment 58 formed by the wrapper plate 60 and the cover plate 62 is lined with plastic refractory 63 attached by means of anchor devices 64. A peep hole 65 is provided through the cover plate 62 opposite the back end of the flue 56, and a closing swing cover plate 66 is provided therefor. A smoke box flanged outlet 67 is provided in the cover plate 62 communicating the compartment 59 with the atmosphere. A sealing gasket 68 is provided between the flanges 61 and the cover plate 62.

The banks 45 and 46 of boiler tubes are supported water-tight at their ends respectively in the front casing head 37 and in the rear casing head 38. The bank 45 of boiler tubes communicates the back fire compartment 58 with the front fire compartment 47. The bank 46 of boiler tubes communicates the front fire compartment 47 with the smoke compartment 59.

Figure 2:
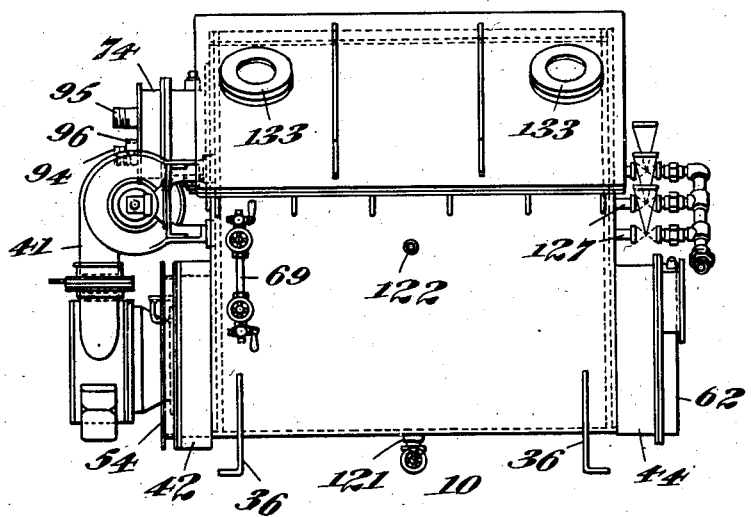
Fig. 2 is an opposite side elevation thereof.

A water gauge 69 is shown in Fig. 6 in imaginary lines, and again in Figs. 2 and 3, as being mounted upon the right hand side of the container shell 11 and communicates the highest point of the interior of the boiler compartment with a point therein between its normal water level for a well known purpose.

Figure 5:
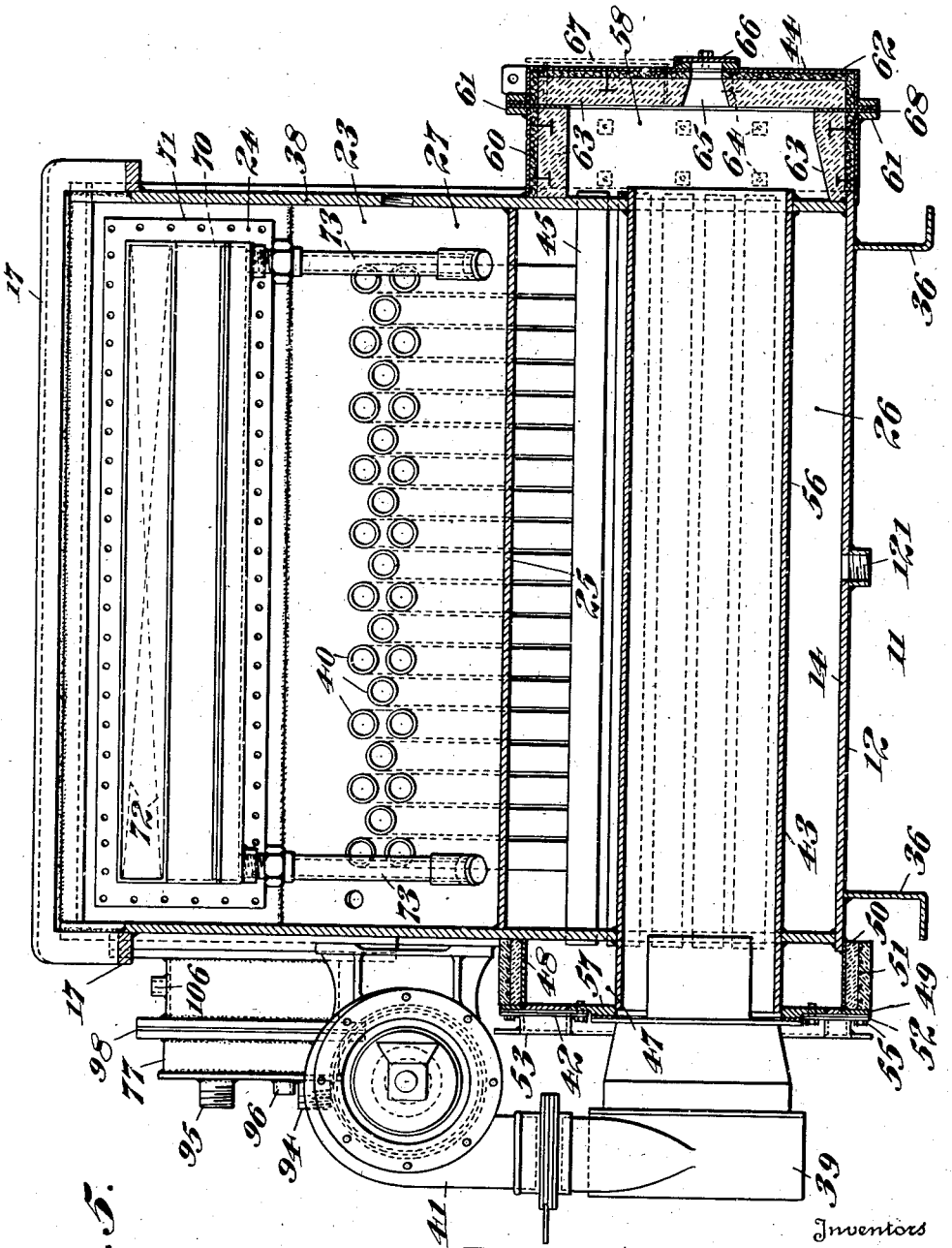
Fig. 5 is a view taken along the line 5—5 of Fig. 6 as viewed in the direction of the arrows, but with the oil burner and blower shown in full elevation.

Referring now to Figs. 5 and 6 the evaporator compartment 27 is communicated with the distilling condenser and condensate cooler compartment 28 by means of an opening 70 in the division wall plate 24 extending substantially full length thereof. Placed over and commanding the opening 70 and detachably mounted on the wall plate 24 by suitable retaining devices (such as bolts) not shown is the vapor separator 71. The vapor separator 71 is preferably a standard Bethlehem vapor separator of the type and design shown and disclosed in the copending patent application Serial No. 539,214, filed June 7, 1944, by Eugene Porter Worthen et al. and need not herein be further described. The separator 71 is provided with inlet opening 72 (indicated in Fig. 5 by light crossed dotted lines) through which when the evaporator is operating vapor passes on its way to the compartment 28. Depending from the separator 71 are drain pipes 73 which when the evaporator is operating delivers the water separated from the vapor passing through the separator 71 to below the surface of the water being evaporated within the compartment 27.

Contained within the distilling condenser and condensate cooler compartment 28 is the distilling condenser and condensate cooler unit 74. (See Figs. 6, 7, and 8.) This unit 74 extends through an opening 75 in the front casing head 37. The opening 75 is reenforced about its periphery by the integrally welded ring 76 which forms the mounting pad for the unit 74.

The distilling condenser and condensate cooler unit 74 comprises the outer conduit head 77; outer tube sheet plate 78; four sets of tubes 79, 80, 81, and 82; wrapper plate casing 83; mounting flange 84; vertical baffle 85; horizontal baffle 86; inner tube sheet plate 87; and inner conduit head 88.

The outer conduit head 77 is a welded plate unit comprising the cylindrical wrapper plate 89, reenforcing flange 90, cover plate 91, horizontal division wall 92, vertical division wall 93, circulating water inlet pipe connection 94, circulating water outlet pipe connection 95, thermometer connection 96, thermometer connection 97, and gasket 98. It will be noted that the division walls 92 and 93 form in the conduit head 77 a lower chamber 99, an upper right hand chamber 100, and an upper left hand chamber 101. The outer conduit head 77 is detachably mounted on the outer tube sheet plate 78, and the latter together with the flange 90 are adapted for retaining devices (such as bolts) not shown.

The outer tube sheet plate 78 forms the water-tight support for the outer ends of the sets of tubes 79, 80, 81, and 82.

The wrapper plate casing 83 together with the tube sheet plates 78 and 87 welded water-tight to its front and rear ends respectively forms an interior cylindrical compartment 102 enclosing the sets of tubes 79, 80, 81, and 82. The interior compartment 102 is communicated with the compartment 28 through an opening 103 on the top rear end of the casing 83. Spaced from the outer tube sheet plate 78 and welded water-tight to the casing 83 is the mounting flange 84. The mounting flange 84 and the ring 76 are adapted for retaining devices (such as bolts) not shown whereby the unit 74 is detachably mounted to the container shell 11. In the space between the tube sheet plate 78 and the flange 84, the casing 83 is provided with drain pipe connection 104, combined air and condensate pump connection 105, and vent pipe connection 106.

Carried within the compartment 102 and spaced a short distance from the tube sheet plate 78 is the vertical baffle 85. The baffle 85 is supported as by welding at the sides thereof to the interior of the casing 83 but is spaced from the top and bottom surfaces of casing 83 to form passageways therealong.

Carried within the compartment 102 is the baffle 86 extending horizontally between the lower set of tubes 79 and the upper sets of tubes 80, 81, and 82 and rearwardly from the vertical baffle 85 to the front end of the opening 103. The baffle 86 is supported as by welding along its longitudinal edges to the sides of the casing 83.

The inner tube sheet plate 87 forms the water-tight support for the rear ends of the sets of tubes 79, 80, 81, and 82, and is adapted for retaining devices (such as bolts) not shown for detachably supporting the inner conduit head 88.

The inner conduit head 88 is a welded plate unit comprising the cylindrical wrapper plate 107, reenforcing flange 108, cover plate 109, horizontal division wall 110, vertical division wall 111, and gasket 112. It will be noted (see Fig. 7) that the horizontal division wall 110 extends from the left hand side of the wrapper plate 107 to the lower edge of the vertical division wall 111 thus forming in the conduit head 88 a three-quarter segment shaped chamber 113 comprising the lower half and an upper right hand quarter of the head space therein, and a quarter segment shaped chamber 114 comprising the remainder of said head space.

It may now be noted that the set 79 of tubes communicates the chamber 99 in the conduit head 77 with the chamber 113 in the conduit head 88. The chamber 113 communicates the rear end of the set 79 of tubes with the rear end of the set 80 of tubes. The set 80 of tubes communicates the chamber 113 with the chamber 100 in the conduit head 77. The chamber 100 communicates the front end of the set 80 of tubes with the front end of the set 81 of tubes. The set 81 of tubes communicates the chamber 100 with the chamber 114 of the conduit head 88. The chamber 114 communicates the rear end of the set 81 of tubes with the rear end of the set 82 of tubes. The set 82 of tubes communicates the chamber 114 with the chamber 101 of the conduit head 77.

As the distilling condenser and condensate cooler unit is designed for removal for inspection and repairs, slide rails 115 and 116 are provided to support the inner tube sheet plate 87. The rails 115 and 116 (see Figs. 5 and 6) extend full length between and are welded to the casing heads 37 and 38 within the compartment 28 and are further supported by and welded to the sloping division wall plate 22. The front and lower corners are cut off as at 117 to provide drainage for condensate.

In the feed water box 29 a pipe connection 118 is provided in the front end plate 31 for feed water inlet (see Figs. 1, 3, and 5). Also in the rear end plate 31' pipe connection 119 is provided for a thermometer (see Figs. 4 and 9), and in the inspection cover 35 pipe connection and plug 120 is provided for draining (see Figs. 1, 4, and 9).

In the bottom of casing 12 a pipe connection 121 is provided for feed and drain purposes to boiler compartment 26 (see Figs. 1, 2, 5, and 6).

In the right hand side of the casing 12 a pipe connection 122 is provided for drain purposes from evaporator compartment 27 (see Figs. 2 and 6).

In the rear casing head 38 are provided a number of pipe connections as follows (see Figs. 4 and 9)—communicating with the boiler compartment 26—connection 123 for vent valve (not shown); connection 124 for thermometer (not shown); connection 125 for pressure gage (not shown); and connection 126 for relief valve (shown in Fig. 4). Communicating with the evaporator chamber 27—three connections 127 at different levels for drain valves 128; connection 129 for thermometer (not shown); and connection 130 for pressure gage (not shown). Communicating with the distilling condenser and condensate cooler chamber 28—connection 131 for relief valve (shown in Fig. 4); and connection 132 for drain plug.

Sight glasses 133 are provided (see Figs. 2, 3, 4, and 6) in the inspection door 21 for viewing the interior of evaporator compartment 27.

We will now describe the operation of our improved apparatus for evaporating and distilling water. From the detail description of our apparatus as hereinbefore set forth it will be recognized that our invention comprises the placing within a single shell container the chief esssential elements of a low pressure, single effect, oil fired distilling unit, and the placing upon and about the said container the various instrumentalities for causing the sequential and cooperating flow of liquids and vapors in and through the said essential elements and instrumentalities during the operation of evaporating and distilling pure water from sea water, or contaminated fresh water. The operation is as follows:

In preparation for use the boiler compartment 26 will be filled through the feed and drain pipe connection 121 with pure water to a level somewhat above the top row of tubes. Since the boiler is a closed system, and when in operation the water is used over and over again, no make up feed water is required. This results in the elimination of the usual boiler feed pump, controls, and piping, and also in the elimination of tube scaling due to impurities in the feed water.

Sea or other circulating water to be evaporated and distilled is pumped under pressure (as by pump 134, Fig. 1) from the source of supply to the circulating water inlet pipe connection 94 communicating with the chamber 99 in the conduit head 77 of the distilling condenser and condensate cooler unit 74. In passing through the unit 74 the circulating water traverses sequentially the following circulating conduit elements therein: chamber 99, tubes 79, chamber 113, tubes 80, chamber 100, tubes 81, chamber 114, tubes 82, chamber 101, and circulating water outlet pipe connection 95. In passing through the lower set 79 of tubes the circulating water serves as a condensate cooler heat exchange medium—in passing through the upper three sets 80, 81, and 82 of tubes the circulating water serves as a distilling condenser heat exchange medium. Leaving the unit 74 the circulating water having served its purpose as a heat exchange medium in its passage through the unit 74 is divided—a portion is diverted through pipe 135 to serve as feed water to be evaporated and distilled while the remainder is discharged to waste through pipe 136. The pipe 135 is provided with control valve 137 and is connected to discharge to pipe connection 118 in the feed water box 29. No feed pump is required since the pressure in the circulating water discharge line is maintained at a greater pressure than that existing in the evaporator chamber 27.

When the feed water enters the feed water box 29 it rises in the evaporator tubes 40 and overflows from their upper ends into the evaporator compartment 27. During operation the brine that is not evaporated is continually being withdrawn from the compartment 27 through the pipe connections 127 and valves 128 by the brine pump 138 (see Fig. 4). The level of the brine within the evaporator compartment 27 is determined by which one of the three valves 128 is open to suction.

With the boiler compartment 26 and evaporator compartment 27 filled with their respective waters the fire tube boiler 39 is put into operation by starting the blower and burner unit 41. The oil burner fires into the fire tube furnace flue 43. The hot gases emerging from the back end of the furnace flue 43 enter and traverse the fire box compartment 58 and are directed to enter and traverse the bank 45 of boiler tubes to the front end thereof to enter and traverse the compartment 47 and are here directed to enter and traverse the bank 46 of boiler tubes to the rear end thereof to enter the smoke box compartment 59 and thence to the atmosphere through the smoke box outlet connection 67.

As a result of the circulation of the hot gases of combustion through the furnace and fire tubes, as just described, the water within the boiler compartment 26 absorbs the heat on the outside of the tubes and generates steam. The generated steam rises to the upper part of the boiler compartment 26 and surrounding the exterior surfaces of the inclined evaporator tubes 40 condenses thereon and gives up its latent heat to the feed water inside the tubes 40 causing it to boil. The resultant mixture of water and vapor is discharged from the upper end of the evaporator tubes 40 into the evaporator compartment 27 while the water condensed on the outside of the tubes 40 falls back into the boiler compartment 26 to be regenerated over and over again.

The vapor discharged from the evaporator tubes 40 rises to the upper confines of the evaporator compartment 27 and is drawn through the separator 71 and opening 70 in the division wall plate 24 into the distilling condenser and condensate cooler compartment 28. In passing through the separator 71 the vapor gives up its entrained water which is returned through the drain pipes 73 to the body of unevaporated water in the lower part of the evaporator chamber 27.

The vapor entering the distilling condenser and condensate cooler compartment 28 is drawn to the opening 103 in the casing 83 of the distilling condenser and condensate cooler unit 74 and circulating therethrough is condensed. As vapor and air enter the casing 83 they tend to pass forward over and around the sets of tubes 80, 81, and 82 and above the horizontal baffle plate 86. The vapor is thus condensed, and the air arriving at the front end passes over the vertical baffle 85 to the air cooler space between the tube sheet plate 78 and the vertical baffle 85 to the suction outlet 105 and is removed. The condensate meanwhile drips from the tubes to the horizontal baffle plate 86, runs along it to the back edge and falls into the lower or condensate cooler section of the casing 83. The condensate next moves forward along the set of tubes 79 and passes under the vertical baffle 85 to the suction outlet 105 and is removed simultaneously with the aforementioned air by way of the suction pipe 139, combined condensate and air pump 140, and connecting air venting chamber 141. The condensate is discharged from the air chamber 141 through pipe 142 to storage for use.

We have described the preferred operation of our apparatus wherein by the use of a combined condensate and air pump we are able to maintain approximately 22" Hg of vacuum in the distilling condenser and condensate cooler chamber 28, however, when desired, or in an emergency the apparatus may be operated at atmospheric pressure. In the latter case the capacity will be less than when operated under a vacuum, but the condensate and air pump, and the brine discharge pump may be eliminated.

It will be understood that although we have shown the location of the feed pump 134, the brine discharge pump 138, and the combined condensate and air pump 140 diagrammatically detached they may be mounted on the unit if desired.

A further preferred operating condition of our apparatus is with regard to having the operating steam pressure of the boiler between zero and five pounds gage pressure. It is a well known fact that the rate of scale formation on salt water evaporating heating surfaces increases rapidly with increase of temperature. As the evaporating surfaces of our apparatus are heated by steam of preferably less than five pounds gage pressure the rate of scale formation will not be any greater than that of a conventional low pressure evaporator using auxiliary exhaust steam.

Although we have described and illustrated our invention in considerable detail, we do not wish to be limited to the exact and specific details thereof as shown and described, but may use such modifications in, substitutions for or equivalent thereof, as are embraced within the scope of our invention or as pointed out in the claims.

Having thus described our invention, what we claim as new and desire to secure by Letters Patent is:

1. In apparatus for distilling a liquid, a container, wall means within said container dividing the same into a first compartment, a second compartment, and a third compartment, said first compartment being adapted to contain a body of water operatively hermetically sealed therein and having a liquid vaporizing portion and a vapor condensing portion, said vapor condensing portion comprising an inlet feed box longitudinally disposed exteriorly thereto and a plurality of water tubes passing through said vapor condensing portion and communicating said feed box with said second compartment, said second compartment being adapted to contain a body of water and having a liquid vaporizing portion and a vapor separating portion, said third compartment comprising a vapor condensing portion, means for communicating the vapor separating portion of said second compartment with the vapor condensing portion of said third compartment, heater means within said first compartment for heating and vaporizing liquid therein, means for conveying feed liquid in preheat heat interchanging relationship successively with vapor in the vapor condensing portion of said third compartment and the vapor condensing portion of said first compartment and then into said second compartment whereby said vapors in both said third and said first compartments are condensed while progressively preheating and vaporizing said feed liquid, means for maintaining a pressure differential between said second compartment and said third compartment, and means for collecting for use condensate formed in the vapor condensing portion of said third compartment.

2. In apparatus for distilling a liquid, a container, wall means within said container dividing the same into a first compartment, a second compartment, and a third compartment, said first compartment being adapted to contain a body of water operatively hermetically sealed therein and having a liquid vaporizing portion and a vapor condensing portion, said vapor condensing portion comprising an inlet feed box longitudinally disposed exteriorly thereto and a plurality of transversely disposed water tubes sloping upwardly through the upper reaches of said vapor condensing portion and communicating said feed box with said second compartment, said second compartment being adapted to contain a body of water and having a liquid vaporizing portion and a vapor separating portion, said third compartment comprising a vapor condensing portion, means for communicating the vapor separating portion of said second compartment with the vapor condensing portion of said third compartment, heater means within said first compartment for heating and vaporizing liquid therein, means for conveying feed liquid in preheat heat interchanging relationship successively with vapor in the vapor condensing portion of said third compartment and the vapor condensing portion of said first compartment and then into said second compartment whereby said vapors in both said third and said first compartments are condensed while progressively preheating and vaporizing said feed liquid, means for maintaining a pressure differential between said second compartment and said third compartment, and means for collecting for use condensate formed in the vapor condensing portion of said third compartment.

3. In apparatus for distilling a liquid, a container, wall means within said container dividing the same into a first compartment, a second compartment, and a third compartment, said first compartment being adapted to contain a body of water operatively hermetically sealed therein and having a liquid vaporizing portion and a vapor condensing portion, said vapor condensing portion comprising an inlet feed box longitudinally disposed exteriorly thereto and a plurality of transversely disposed water tubes sloping upwardly through the upper reaches of said vapor condensing portion and communicating said feed box with said second compartment, removable cover plates comprising closures for openings to the interior of said inlet feed box and said second compartment, one of said cover plates being transverse to and intersecting the axes extended of said water tubes whereby axial access may be had to ends of said water tubes, said second compartment being adapted to contain a body of water and having a liquid vaporizing portion and a vapor separating portion, said third compartment comprising a vapor condensing portion, means for communicating the vapor separating portion of said second compartment with the vapor condensing portion of said third compartment, heater means within said first compartment for heating and vaporizing liquid therein, means for conveying feed liquid in preheat heat interchanging relationship successively with vapor in the vapor condensing portion of said third compartment and the vapor condensing portion of said first compartment and then into said second compartment whereby said vapors in both said third and said first compartments are condensed while progressively preheating and vaporizing said feed liquid, means for maintaining a pressure differential between said second compartment and said third compartment, and means for collecting for use condensate formed in the vapor condensing portion of said third compartment.

4. In apparatus for distilling a liquid, a container, wall means within said container dividing the same into a first compartment, a second compartment, and a third compartment, said first compartment being adapted to contain a body of water operatively hermetically sealed therein and having a liquid vaporizing portion and a vapor condensing portion, said liquid vaporizing portion comprising a fluid fuel burner and a stack outlet mounted exteriorly to said first compartment, a plurality of fire tubes extending longitudinally through said liquid vaporizing portion and communicating said burner with said stack outlet whereby heat and products of combustion may pass from said burner to said stack outlet in heat interchanging relationship with liquid in said first compartment for the purpose of heating and vaporizing liquid therein, said vapor condensing portion comprising an inlet feed box longitudinally disposed exteriorly thereto and a plurality of water tubes passing through said vapor condensing portion and communicating said feed box with said second compartment, said second compartment being adapted to contain a body of water and having a liquid vaporizing portion and a vapor separating portion, said third compartment comprising a vapor condensing portion, means for communicating the vapor separating portion of said second compartment with the vapor condensing portion of said third compartment, means for conveying feed liquid in preheat heat interchanging relationship successively with vapor in the vapor condensing portion of said third compartment and the vapor condensing portion of said first compartment and then into said second compartment whereby said vapors in both said third and said first compartments are condensed while progressively preheating and vaporizing said feed liquid, means for maintaining a pressure differential between said second compartment and said third compartment, and means for collecting for use condensate formed in the vapor condensing portion of said third compartment.

5. In apparatus for distilling a liquid, a container, wall means within said container dividing the same into a first compartment, a second compartment, and a third compartment, said first compartment being adapted to contain a body of water operatively hermetically sealed therein and having a liquid vaporizing portion and a vapor condensing portion, said liquid vaporizing portion comprising a fluid fuel burner and a stack outlet mounted exteriorly to said first compartment, a plurality of fire tubes extending longitudinally through said liquid vaporizing portion and communicating said burner with said stack outlet whereby heat and products of combustion may pass from said burner to said stack outlet in heat interchanging relationship with liquid in said first compartment for the purpose of heating and vaporizing liquid therein, said vapor condensing portion comprising an inlet feed box longitudinally disposed exteriorly thereto and a plurality of transversely disposed water tubes sloping upwardly through the upper reaches of said vapor condensing portion and communicating said feed box with said second compartment, said second compartment being adapted to contain a body of water and having a liquid vaporizing portion and a vapor separating portion, said third compartment comprising a vapor condensing portion, means for communicating the vapor separating portion of said second compartment with the vapor condensing portion of said third compartment, means for conveying feed liquid in preheat heat interchanging relationship successively with vapor in the vapor condensing portion of said third compartment and the vapor condensing portion of said first compartment and then into said second compartment whereby said vapors in both said third and said first compartments are condensed while progressively preheating and vaporizing said feed liquid, means for maintaining a pressure differential between said second compartment and said third compartment, and means for collecting for use condensate formed in the vapor condensing portion of said third compartment.

6. In apparatus for distilling a liquid, a container, wall means within said container dividing the same into a first compartment, a second compartment, and a third compartment, said first compartment being adapted to contain a body of water operatively hermetically sealed therein and having a liquid vaporizing portion and a vapor condensing portion, said liquid vaporizing portion comprising a fluid fuel burner and a smoke vestibule mounted exteriorly at one end of said first compartment, a combustion vestibule and a stack outlet mounted exteriorly at the opposite end thereof, a relatively large combustion tube extending longitudinally through said smoke vestibule and said liquid vaporizing portion and communicating said burner with said combustion vestibule, a plurality of smaller fire tubes extending longitudinally through said liquid vaporizing portion, a portion of said smaller tubes communicating said combustion vestibule with said smoke vestibule and the remaining of said smaller tubes communicating said smoke vestibule with said stack outlet whereby heat and products of combustion may pass in a tortuous passage from said burner to said stack outlet in heat interchanging relationship with liquid in said first compartment for the purpose of heating and vaporizing liquid therein, said vapor condensing portion comprising an inlet feed box longitudinally disposed exteriorly thereto and a plurality of transversely disposed water tubes sloping upwardly through the upper reaches of said vapor condensing portion and communicating said feed box with said second compartment, said second compartment being adapted to contain a body of water and having a liquid vaporizing portion and a vapor separating portion, said third compartment comprising a vapor condensing portion, means for communicating the vapor separating portion of said second compartment with the vapor condensing portion of said third compartment, means for conveying feed liquid in preheat heat interchanging relationship successively with vapor in the vapor condensing portion of said third compartment and the vapor condensing portion of said first compartment and then into said second compartment whereby said vapors in both said third and said first compartments are condensed while progressively preheating and vaporizing said feed liquid, means for maintaining a pressure differential between said second compartment and said third compartment, and means for collecting for use condensate formed in the vapor condensing portion of said third compartment.

7. In apparatus for distilling a liquid, a container, wall means within said container dividing the same into a first compartment, a second compartment, and a third compartment, said first compartment being adapted to contain a body of water operatively hermetically sealed therein and having a liquid vaporizing portion and a vapor condensing portion, said liquid vaporizing portion comprising a fluid fuel burner and a smoke vestibule mounted exteriorly at one end of said first compartment, a combustion vestibule and a stack outlet mounted exteriorly at the opposite end thereof, a relatively large combustion tube extending longitudinally through said smoke vestibule and said liquid vaporizing portion and communicating said burner with said combustion vestibule, a plurality of smaller fire tubes extending longitudinally through said liquid vaporizing portion, a portion of said smaller tubes communicating said combustion vestibule with said smoke vestibule and the remaining of said smaller tubes communicating said smoke vestibule with said stack outlet whereby heat and products of combustion may pass in a tortuous passage from said burner to said stack outlet in heat interchanging relationship with liquid in said first compartment for the purpose of heating and vaporizing liquid therein, said vapor condensing portion comprising an inlet feed box longitudinally disposed exteriorly thereto and a plurality of transversely disposed water tubes sloping upwardly through the upper reaches of said vapor condensing portion and communicating said feed box with said second compartment, said second compartment being adapted to contain a body of water and having a liquid vaporizing portion and a vapor separating portion, said third compartment comprising a vapor condensing portion, means for communicating a vapor separating portion of said second compartment with the vapor condensing portion of said third compartment, means for conveying feed liquid in preheat heat interchanging relationship successively with vapor in the vapor condensing portion of said third compartment and the vapor condensing portion of said first compartment and then into said second compartment whereby said vapors in both said third and said first compartments are condensed while progressively preheating and vaporizing said feed liquid, means for maintaining a pressure differential between said second compartment and said third compartment, and means for collecting for use condensate formed in the vapor condensing portion of said third compartment.

8. In apparatus for distilling a liquid, a container, wall means within said container dividing the same into a first compartment, a second compartment, and a third compartment, said first compartment being adapted to contain a body of water operatively hermetically sealed therein and having a liquid vaporizing portion and a vapor condensing portion, said liquid vaporizing portion comprising a fluid fuel burner and a stack outlet mounted exteriorly to said first compartment, a plurality of fire tubes extending longitudinally through said liquid vaporizing portion and communicating said burner with said stack outlet whereby heat and products of combustion may pass from said burner to said stack outlet in heat interchanging relationship with liquid in said first compartment for the purpose of heating and vaporizing liquid therein, said vapor condensing portion comprising an inlet feed box longitudinally disposed exteriorly thereto and a plurality of transversely disposed water tubes sloping upwardly through the upper reaches of said vapor condensing portion and communicating said feed box with said second compartment, removable cover plates comprising closures for openings to the interior of said inlet feed box and said second compartment, one of said cover plates being transverse to and intersecting the axes extended of said water tubes whereby axial access may be had to ends of said water tubes, said second compartment being adapted to contain a body of water and having a liquid vaporizing portion and a vapor separating portion, said third compartment comprising a vapor condensing portion, means for communicating the vapor separating portion of said second compartment with the vapor condensing portion of said third compartment, means for conveying feed liquid in preheat heat interchanging relationship successively with vapor in the vapor condensing portion of said third compartment and the vapor condensing portion of said first compartment and then into said second compartment whereby said vapors in both said third and said first compartments are condensed while progressively preheating and vaporizing said feed liquid, means for maintaining a pressure differential between said second compartment and said third compartment, and means for collecting for use condensate formed in the vapor condensing portion of said third compartment.

9. In apparatus for distilling a liquid, a container, wall means within said container dividing the same into a first compartment, a second compartment, and a third compartment, said first compartment being adapted to contain a body of water operatively hermetically sealed therein and having a liquid vaporizing portion and a vapor condensing portion, said liquid vaporizing portion comprising a fluid fuel burner and a smoke vestibule mounted exteriorly at one end of said first compartment, a combustion vestibule and a stack outlet mounted exteriorly at the opposite end thereof, a relatively large combustion tube extending longitudinally through said smoke vestibule and said liquid vaporizing portion and communicating said burner with said combustion vestibule, a plurality of smaller fire tubes extending longitudinally through said liquid vaporizing portion, a portion of said smaller tubes communicating said combustion vestibule with said smoke vestibule and the remaining of said smaller tubes communicating said smoke vestibule with said stack outlet whereby heat and products of combustion may pass in a tortuous passage from said burner to said stack outlet in heat interchanging relationship with liquid in said first compartment for the purpose of heating and vaporizing liquid therein, said vapor condensing portion comprising an inlet feed box longitudinally disposed exteriorly thereto and a plurality of transversely disposed water tubes sloping upwardly through the upper reaches of said vapor condensing portion and communicating said feed box with said second compartment, removable cover plates comprising closures for openings to the interior of said inlet feed box and said second compartment, one of said cover plates being transverse to and intersecting the axes extended of said water tubes whereby axial access may be had to ends of said water tubes, said second compartment being adapted to contain a body of water and having a liquid vaporizing portion and a vapor separating portion, said third compartment comprising a vapor condensing portion, means for communicating the vapor separating portion of said second compartment with the vapor condensing portion of said third compartment, means for conveying feed liquid in preheat heat interchanging relationship successively with vapor in the vapor condensing portion of said third compartment and the vapor condensing portion of said first compartment and then into said second compartment whereby said vapors in both said third and said first compartments are condensed while progressively preheating and vaporizing said feed liquid, means for maintaining a pressure differential between said second compartment and said third compartment, and means for collecting for use condensate formed in the vapor condensing portion of said third compartment.

EUGENE PORTER WORTHEN.
BENJAMIN FOX.